Sept. 16, 1969　　　R. WICK ET AL　　　3,466,992
FLASH UNIT FOR PHOTOGRAPHIC CAMERAS
Filed May 17, 1966　　　　　　　　　　　　　4 Sheets-Sheet 3
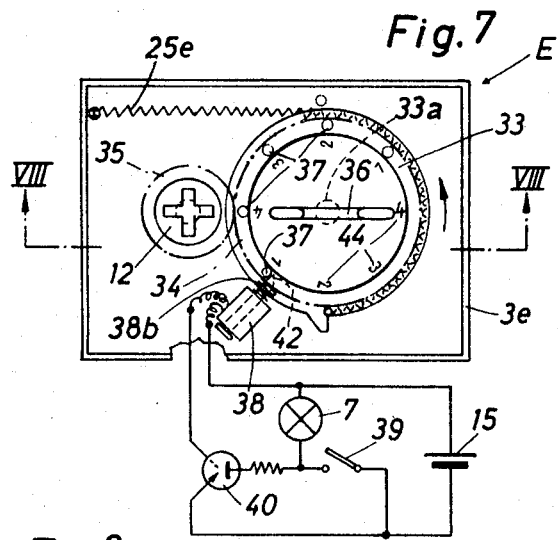
*Fig. 7*
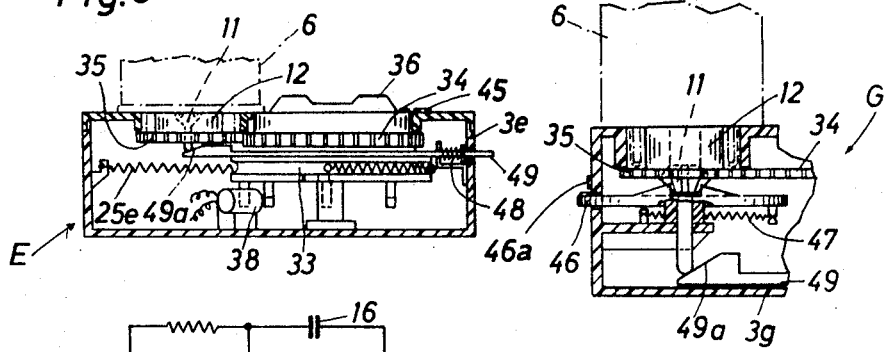
*Fig. 8*　*Fig. 11*
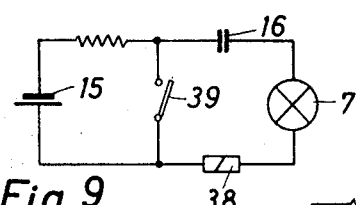
*Fig. 9*
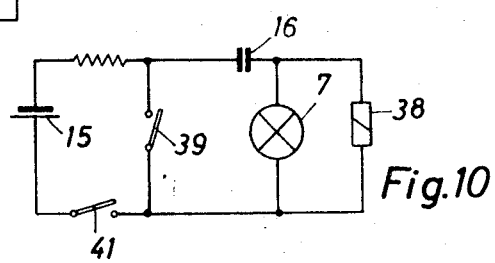
*Fig. 10*
INVENTOR.
RICHARD WICK
KARL WAGNER
JOACHIM VON ALBEDYLL
OTFRIED RENNER
FRIDOLIN HENNIG
BY

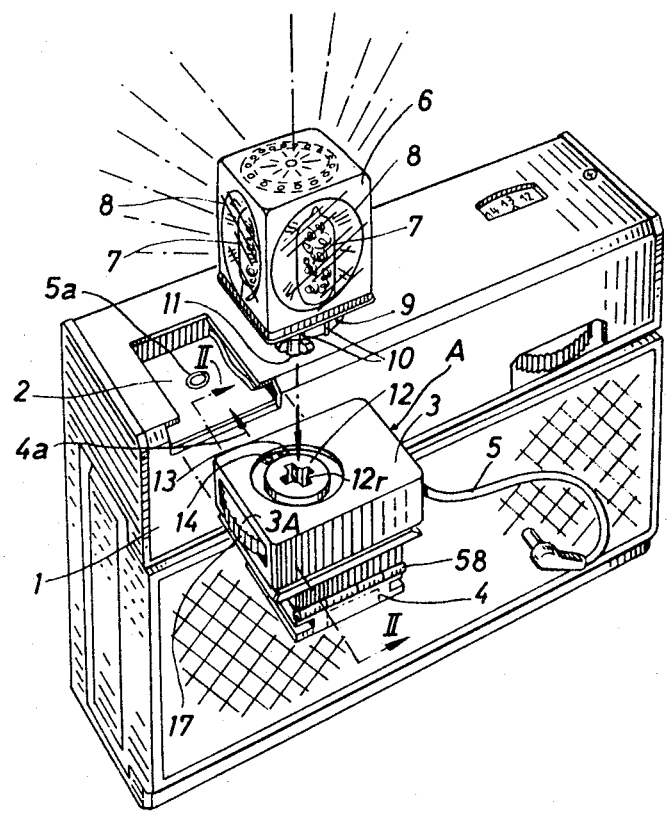

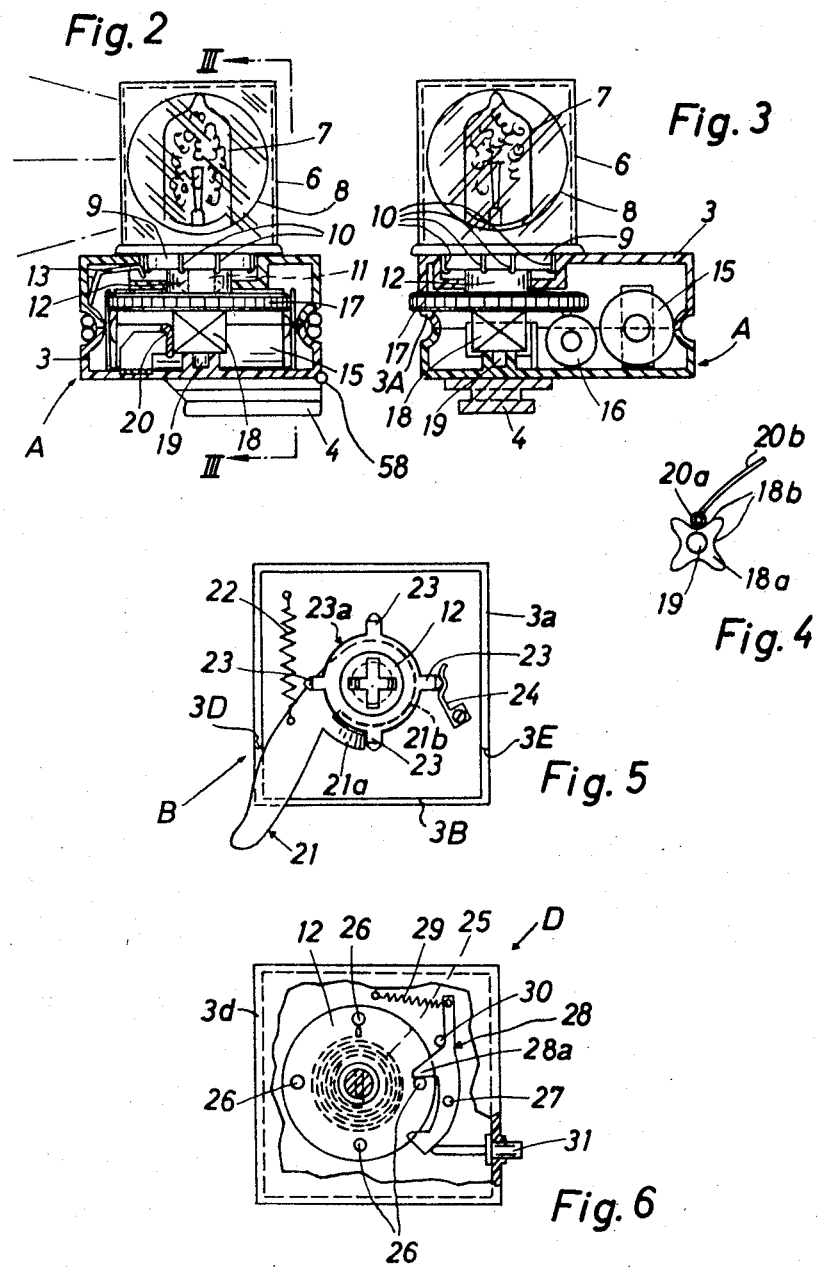

United States Patent Office 3,466,992
Patented Sept. 16, 1969

3,466,992
FLASH UNIT FOR PHOTOGRAPHIC CAMERAS
Richard Wick, Grunwald, near Munich, Karl Wagner, Ottobrunn-Munich, Joachim von Albedyll, Munich, Otfried Renner, Unterhaching, near Munich, and Fridolin Hennig, Munich, Germany, assignors to Agfa-Gevaert Aktiengesellschaft, Leverkusen, Germany
Filed May 17, 1966, Ser. No. 550,805
Claims priority, application Germany, July 26, 1965,
A 49,847
Int. Cl. G03b 9/70, 15/035
U.S. Cl. 95—11.5      22 Claims

ABSTRACT OF THE DISCLOSURE

A flash unit whose housing accommodates an indexible socket for multiple flash light containers and has a foot for insertion into the accessory shoe of a camera body. The socket is indexible by a spring motor which can be wound in response to rotation of the container. Closing of the synchronizing switch in the camera energizes an electromagnet which effects angular displacement of the socket to place a fresh flash light into an optimum position for firing.

---

The present invention relates to flash units for photographic cameras. More particularly, the invention relates to improvements in flash units of the type which may utilize so-called "Flashcubes" or analogous containers or carriers for two or more flash lamps.

It is already known to provide a flash unit with a reflector and to place the reflector behind a suitable socket which is adapted to receive one flash lamp at a time. It is also known to provide a flash unit with a transporting device which automatically places one of a series of flash lamps in front of a reflector. In certain recent types of flash units, including the aforementioned "Flashcubes," four sides of a turnable cube-shaped carrier or container are located in front of reflectors and a separate flash lamp is accommodated in front of each reflector. By turning the cube-shaped container through angles of 90 degrees, the user can place successive flash lamps to an optimum position for making exposures with flash. The cube-shaped container is attached directly to the body of the camera and the latter accommodates all electrical components of the flash unit, such as a battery and a capacitor, as well as a mechanism for indexing the container to a series of different angular positions.

It is an important object of the present invention to provide a flash unit or flashlamp unit which is constructed and assembled in such a way that it may be readily utilized in conjunction with cameras which are not equipped with a built-in battery and which need not be provided with automatic or semiautomatic indexing means for changing the angular position of a container for a series of flash lamps.

Another object of the invention is to provide a flash unit of the just outlined characteristics which enables the user of the camera on which the flash unit is mounted to take pictures without flash and without necessitating detachment of the flash unit.

A further object of the invention is to provide a very simple drive for the container which is connected to the flash unit.

An additional object of the invention is to provide the flash unit with a very simple indexing mechanism which insures that successive flash lamps are automatically placed to an optimum position for taking pictures with flash in response to each successive manipulation of the drive.

Still another object of the instant invention is to provide a flash unit of the above outlined characteristics which is of very compact design, which can be produced at low cost, and which can be readily installed on many presently known types of photographic cameras.

A concomitant object of the invention is to provide a flash unit wherein a container with spent flash lamps may be ejected manually or in a fully automatic way in response to completed utilization of the last flash lamp.

A further object of the present invention is to provide a flash unit which allows for changes in the customary position of flash lamps so that the operator can select the direction of a beam of artificial light whenever the exposure is to be made with indirect illumination of a subject.

Another object of our invention is to provide a flash unit which can take presently known containers for flash lamps.

Briefly stated, one feature of our present invention relates to an improved flash unit for use on photographic cameras, particularly on still cameras. In its simplest form, the improved flash unit comprises a housing which can accommodate a source of electrical energy and/or one or more other components of the flash circuit, a coupling member provided on or connected with the housing and adapted to engage an accessory shoe or an analogous complementary coupling member on the camera to thus provide a separable connection between the camera and the housing, and socket means rotatably supported by the housing and adapted to receive a plug or an analogous portion of a flash lamp container of the type having a plurality of sides with a flash lamp and a reflector located behind each side. Such containers may be of the type sold under the name of "Flashcube."

In accordance with another feature of the present invention, the housing of the flash unit may accommodate or support one or more components of manually operated or automatic drive means for the socket means, and such drive means may be combined with suitable indexing means serving to insure that successive operations of the drive means will cause successive flash lamps to face in a predetermined direction.

The novel features which are considered as characteristic of the invention are set forth in particular in the appended claims. The improved flash unit itself, however, both as to its construction and its mode of operation, together with additional features and advantages thereof, will be best understood upon perusal of the following detailed description of certain specific embodiments with reference to the accompanying drawings, in which:

FIG. 1 is a perspective view of a still camera and of a flash unit which embodies one form of our invention, the flash unit being detached from the camera and from the lamp container;

FIG. 2 is an enlarged vertical section through the flash unit substantially as seen in the direction of arrows from the line II—II of FIG. 1, with the container connected to the socket of the flash unit;

FIG. 3 is a section substantially as seen in the direction of arrows from the line III—III of FIG. 2;

FIG. 4 illustrates an indexing mechanism which may be used as a substitute for the indexing mechanism in the flash unit of FIGS. 1 to 3;

FIG. 5 is a top plan view of a modified flash unit wherein the drive means comprises a rockable lever and wherein the indexing mechanism differentiates from the mechanisms shown in FIGS. 2–3 and 4;

FIG. 6 is a bottom plan view of a further flash unit with its housing partly broken away to reveal the components of a simple spring motor which is used to change the angular position of the container;

FIG. 7 is a top plan view of an additional flash unit which comprises a different spring motor and wherein the socket for the container is indexed in automatic response to making of an exposure with flash;

FIG. 8 is a section substantially as seen in the direction of arrows from the line VIII—VIII of FIG. 7;

FIG. 9 illustrates an electric circuit which may be used as a substitute for the circuit of the flash unit shown in FIGS. 7 and 8;

FIG. 10 illustrates a further electric circuit;

FIG. 11 is a fragmentary vertical section through a flash unit which constitutes a modification of the flash unit shown in FIGS. 7 and 8;

Figure 12:
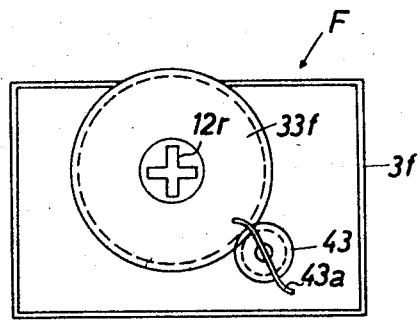
FIG. 12 is a top plan view of certain components of a flash unit which resembles the flash unit shown in FIGS. 7 and 8.

Referring to the drawings in detail, and first to FIG. 1, there is shown a photographic camera 1 whose top wall is provided with a female coupling member in the form of an accessory shoe 2. The improved flash unit is indicated by the reference numeral A, and its housing 3 has a lower portion which is carried by a male coupling member or foot 4 insertable into and withdrawable from the shoe 2 in and counter to the direction indicated by an arrow 4a. The connection with the synchronization switch of the camera 1 may be established through the intermediary of a cable 5 or by means of a contact element 5a located centrally within the space defined by the shoe 2. The housing 3 supports a rotary socket 12 having a cruciform recess 12r which can receive a suitably configurated plug 11 provided at the underside of a self-contained multiple lamp container or carrier 6 which resembles a cube and is known under the name "Flashcube." The four vertical sides of the container 6 are located in front of an equal number of expendable flash lamps 7 each of which is located in front of a suitably configurated reflector 8. The container 6 (or at least the outer shell of this container) consists of transparent material. The plug 11 extends downwardly from a diskshaped base 9 of the container 6, and this base carries four pairs of twin contacts 10, one pair for each of the four lamps 7. The housing 3 carries a pair of complementary contacts 13, 14 which engage a pair of contacts 10 whenever the container 6 is properly oriented with reference to the housing 3, i.e., whenever one of the flash lamps 7 faces the subject. When the contacts 13, 14 engage a pair of contacts 10, the circuit of the respectivte flash lamp 7 can be completed through a suitable synchronizing switch which is provided in or on the camera 1 and is not illustrated in FIG. 1. FIG. 3 shows that the just mentioned circuit further includes a battery 15 or a similar source of electrical energy which is accommodated in the housing 3, and a capacitor 16. The housing 3 may accommodate additional electrical components of the flash circuit. The lamp 7 which faces the subject will emit artificial light in response to closing of the aforementioned synchronizing switch. In order to make the next exposure with flash, the user of the camera 1 must cause the socket 12 to turn with the container 6 through an angle of 90 degrees so as to place the next unused lamp 7 to an optimum position for bringing about artificial illumination of the subject. In response to such turning through 90 degrees, the contacts 13, 14 are engaged by the next pair of contacts 10.

The drive which serves to rotate the socket 12 (and hence the carrier 6) may be constructed in a number of different ways. FIGS. 1, 2 and 3 illustrate a drive which comprises a hand-operated rotary drive member here shown as a knurled hand wheel 17 a portion of which extends through a slot 3A provided in a side wall of the housing 3 so that the wheel is readily accessible to the fingers of an operator. The wheel 17 is mounted on the shaft 19 of the socket 12 so that the latter rotates in automatic response to turning of the wheel. The flash unit A further comprises an indexing mechanism which insures that the operator will be able to arrest the socket 12 in an angular position in which a lamp 7 faces the subject. This indexing mechanism comprises a cubeshaped indexing member or cam 18 having the same number of vertical sides as the number of lamps 7 in a container 6, and a follower here shown as a leaf spring 20 which is installed in the housing 3 and bears against the vertical sides of the indexing member 18 with a force which varies in response to rotation of the wheel 17. When the bent-over tip of the spring 20 bears flush against one of the four vertical sides of the indexing member 18, the bias of the spring is minimal but such bias first increases and thereupon decreases while the wheel 17 is being rotated through an angle of 90 degrees. In fact, the spring 20 can be strong enough to automatically turn the indexing member 18 and socket 12 as soon as its tip moves beyond a corner portion of the indexing member. When the socket 12 comes to a halt, the axis of one of the reflectors 8 is parallel with the optical axis of the camera 1. The operator will actually feel when the bias of the spring 20 decreases so that he will know when to arrest the wheel 17 in order to insure that a fresh lamp 7 is properly oriented with reference to the subject.

If the user does not wish to make an exposure with flash, he simply leaves a spent lamp 7 in a position in which the axis of the respective reflector 8 is parallel with the optical axis. The camera is then ready to make exposures in daylight or in artificial light but without resorting to the flash unit A. Thus, the unit A can remain attached to the camera 1 regardless of whether the user makes exposures in artificial light or in daylight.

The indexing mechanism 18, 20 can be replaced by a mechanism of the type shown in FIG. 4. The shaft 19 carries an indexing member or cam 18a which resembles a star wheel having four prongs separated by four recesses 18b each bounded by a concave surface. The follower 20a is a roller which is mounted on a resilient arm 20b carried by the housing 3 of the flash unit and urging the roller 20a against the peripheral surface of the indexing member 18a. When the roller 20a moves beyond the tip of a prong on the member 18a, it automatically enters the next recess 18b and arrests the shaft 19 in an angular position in which a fresh flash lamp 7 faces the subject. The number of recesses 18b corresponds to the number of flash lamps 7 in a container 6 and one such lamp is held in requisite position whenever the roller 20a enters the deepmost zone of a recess.

FIG. 1 shows that the foot 4 need not be integral with but can be articulately connected to the bottom wall of the housing 3. The articulate connection between the parts 3 and 4 comprises a hinge 58 which enables the housing 3 to pivot about a horizontal axis extending at right angles to the optical axis so that the operator may produce special illuminating effects by moving the container 6 to a position in which the axis of the reflector 8 facing the subject is inclined with reference to the optical axis. If desired, the axis of the hinge 58 may extend in parallelism with the optical axis so that the housing 3 can be tilted sideways.

FIGS. 2 and 3 show that the housing 3 consists of two separable parts so that the user can gain access to the electrical components, for example, in order to replace a spent battery 15.

Referring now to FIG. 5, there is shown a portion of a modified flash unit B which comprises a housing 3a whose top wall carries the socket 12 in such a way that the latter is indexible to four different angular positions. The drive for the socket 12 comprises a manually operated drive member or lever 21 having an eye 21b which surrounds the shaft of the socket 12. The lever 21 comprises a resilient motion transmitting projection or tongue 21a. The housing 3a is formed with a slot 3B through which the tip of the lever 21 extends, and this lever is permanently biased by a return spring 22 one end of which is secured to the housing 3a and which tends to rock the lever in a clockwise direction, as viewed in FIG. 5, so that the lever normally abuts against a stop shoulder 3D. The indexing mechanism comprises a substantially cruciform indexing member 23a having four radially outwardly extending prongs 23 and rigidly secured to or integral with the socket 12. The prongs 23 cooperate with a follower here shown as a leaf spring 24 which is fixedly secured to the housing 3a and has a suitable recess to accommodate the tip of one prong 23 at a time. In order to turn the socket 12 through an angle of 90 degrees, the operator moves the lever 21 in a counterclockwise direction until the lever engages a stop shoulder 3E. During such movement of the lever 21, the tongue 21a engages one of the prongs 23 and advances the latter into engagement with the spring 24. When the lever 21 is released, the spring 22 contracts and returns it into abutment with the stop shoulder 3D. The bias of the spring 24 is strong enough to insure that the tongue 21a is deformed while engaging a prong 23 on its way back to the position shown in FIG. 3. When it reaches such position, the tongue 21a is allowed to reassume its normal shape and moves behind the adjoining prong 23 so that it can again transport the indexing member 23a in response to anticlockwise displacement of the lever 21.

It is clear that the position of the spring 24 may be changed without departing from the spirit of our invention. Thus, the spring 24 need not engage and retain that prong 23 which is being advanced by the tongue 21a. All that counts is to place the spring 24 in such position that one of the flash lamps 7 will face the subject when the spring 24 engages one of the prongs 23.

The tongue 21a and the projections 23 constitute the components of a one-way clutch which is operative when the lever 21 is turned in a predetermined (counterclockwise) direction.

FIG. 6 illustrates certain parts of a flash unit D having a housing 3d whose bottom wall is broken away to reveal the underside of the socket 12. The drive for the socket comprises a spring motor including a torsion spring 25 one end of which is attached to the socket and the other end of which is anchored in the housing 3d. The indexing mechanism comprises four equidistant projections or pins 26 provided at the underside of the socket 12 and a lever 28 which is fulcrumed at 27 and is permanently biased by a spring 29 tending to move it into abutment with a fixed stop post 30. A tooth 28a of the lever 28 then engages one of the projections 26 and prevents unwinding of the spring 25. The means for releasing the socket 12 so that the latter can rotate in response to unwinding of the spring 25 includes a pushbutton or plunger 31 which is depressible by hand and may rock the lever 28 in a clockwise direction, as viewed in FIG. 6, so that the tooth 28a moves away from the adjoining projection 26. Rapid depression and immediate release of the plunger 31 will result in automatic advance of the socket 12 through an angle of 90 degrees so as to place the next flash lamp into operative position. The position of the projections 26 and tooth 28a is selected in such a way that the tooth engages one of the projections when the axis of a reflector 8 extends in parallelism with the optical axis.

The spring 25 may be wound by a container 6 when the latter is properly coupled with the socket 12 and is turned in a sense to rotate the socket in a clockwise direction, as viewed in FIG. 6. The tooth 28a then merely rides over the projections 26. The spring 25 may be long enough to turn the socket through two or more complete revolutions so that it need not be rewound in response to attachment of each successive container 6.

When the operator wishes to make exposures in daylight, the container 6 is simply left in an angular position in which a spent flash lamp faces the subject. In other words, here again, the container can remain attached to the socket 12 regardless of whether the user makes exposures in daylight or in artificial light.

FIGS. 7 and 8 illustrate a further embodiment of our invention wherein the housing 3e of the flush unit E supports an indexible socket 12 which is not concentric with the spring motor. The latter comprises a disk 33 which is adjacent to the socket 12 and is rotatable about the axis of a shaft 33a. One end of a helical contraction spring 25e is attached to the disk 33 and the other end of this spring is anchored in a side wall of the housing 3e so that the spring normally tends to rotate the disk 33 in a counterclockwise direction, as viewed in FIG. 7. In addition to the spring motor 25e, 33, the drive for the socket 12 further comprises a transmission which includes a gear 34 coaxially secured to the disk 33 and pinion 35 meshing with the gear 34 and secured to the socket 12. This transmission is of the step-up type and is constructed in such a way that a single winding of the spring 25e suffices to rotate the socket 12 through a plurality of full revolutions. The means for winding the spring 25e comprises a handgrip member 36 which is accessible from the upper side of the housing 3e and is adjacent to the carrier 6, see FIG. 8.

The indexing means of the flush unit E comprises a series of equidistant projections or pins 37 which extend from the underside of the disk 33 and an electromagnet 38 having an armature 42 biased outwardly (i.e., toward the shaft 33a) by a helical expansion spring 38b. When the electromagnet 38 is energized, it retracts the armature 42 against the bias of the spring 38b whereby the spring 25e is free to contract and turns the disk 33 in a counterclockwise direction, as viewed in FIG. 7, to rotate the socket 12 in a clockwise direction. The energization of the electromagnet 38 is of very short duration so that the spring 38b is immediately allowed to expand and to return the armature 42 into the path of the next-following projection 37. As shown in FIGS. 7 and 8, the top face of the disk 33 may be provided with a graduated scale 44 (here shown as including two sets of graduations numbered one to four) whose graduations can be brought into registry with a fixed index 45 provided on the top wall of the housing 3e. That graduation which registers with the index 45 is then observable through a window in the top wall of the housing 3e. By looking at the graduation which registers with the index 45, the user of the camera can determine the number of satisfactory flash lamps which remain in the container 6 attached to the socket 12, and the user also knows whether or not the spring 25e requires rewinding. It will be noted that the ratio of the transmission 34, 35 is one-to-two, i.e., that the socket 12 will complete two full revolutions in response to each full revolution of the disk 33. The parts 44, 45 together constitute a counter which allows for convenient determination of the number of available lamps 7.

The flash circuit of the unit E comprises the aforementioned electromagnet 38 (which forms part of the indexing means). FIG. 7 shows that the flash circuit further includes a synchronizing switch 39 which is connected in series with a properly positioned flash lamp 7 and in parallel with the emitter-collector stage of a transistor 40. The transistor 40 controls energization of the electromagnet 38 and its base is connected with the positive pole of the battery 15 when the switch 39 is closed.

FIG. 9 shows a modified circuit wherein the electromagnet 38 is connected in series with the lamp 7 and capacitor 16. In the circuit of FIG. 10, the lamp 7, electromagnet 38 and synchronizing switch 39 are connected in parallel. A further switch 41 is provided and closes automatically, for example, in response to attachment of a container 6. Each of the circuits shown in FIGS. 7, 9 and 10 insures that the electromagnet 38 is energized in response to closing of the synchronizing switch 39 and in response to resultant completion of the lamp circuit.

Such completion of the circuit of the electromagnet 38 results in short-lasting retraction of the armature 42 so that the spring 25e can dissipate some energy and turns the disk 33 through 45 degrees which is tantamount to turning of the socket 12 through an angle of 90 degrees. The electromagnet 38 is deenergized before the next-following projection 37 can bypass the armature 42.

FIG. 12 shows that the spring motor of FIG. 7 may be modified by positioning the disk 33f in such a way that a portion thereof projects from the housing 3f so that the disk may be turned by hand in order to wind the spring 25e which is not shown in FIG. 12. This flash unit F further includes a retard mechanism 43 which cooperates with the disk 33f and prevents sudden unwinding of the spring. The exact construction of the retard mechanism forms no part of the present invention; it may be of the type known as an escapement or of the type using a mass. Instead of rotating the disk 33f, the operator can wind the spring motor by engaging the wings 43a of the mechanism 43.

Referring now to FIG. 11, there is shown a flash unit G having a modified counter including a graduated scale provided on a disk 46 which is rotatable on the shaft of the socket 12 so that it can rotate therewith when engaged by a properly inserted plug 11. An index 46a on the housing 3g registers with successive graduations on the scale 46 when the socket 12 is indexed to successive angular positions. A portion of the scale 46 extends through a suitable slot in the side wall of the housing 3g. A spring 47 is provided to return the disk 46 to starting or zero position when the container 6 is removed from the socket 12, i.e., when the plug 11 is withdrawn so that the wheel 46 can rotate with reference to the socket. The spring 47 stores energy in response to indexing of the socket. The disk 46 has four graduations.

The improved flash unit may be provided with an ejector for the containers 6. As shown in FIG. 8, the ejector may comprise a push rod 49 which is reciprocable in the housing 3e and is biased outwardly by a helical spring 48. A cam 49a at the inner end of the push rod 49 automatically expels the plug 11 from the socket 12 when the outer end of the push rod is depressed against the bias of the spring 48. Of course, a portion of a properly inserted plug 11 must extend downwardly beyond the socket 12 and into the path of the inclined face on the cam 49a. The push rod 49 immediately returns to the position of FIG. 8 as soon as the operator releases its outer end so that the spring 48 is free to expand.

Figure 14:
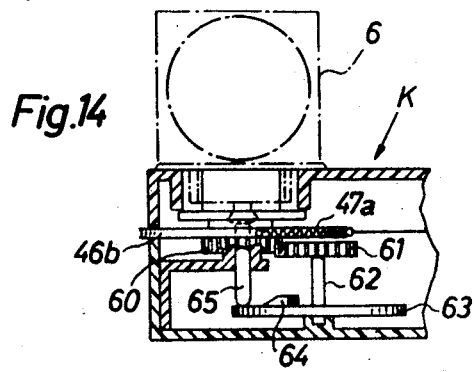
FIG. 14 is a fragmentary vertical section through a flash unit which constitutes a further modification.

It is equally possible to combine the ejector with the spring of the spring motor, for example, as shown in FIG. 14. The spring motor of this flash unit K corresponds to the embodiment of FIG. 11. The disk 46 is connected with a gear 60 which meshes with another gear 61. Gear 61 is fixed on a rotatable shaft 62 together with a disk 63. The disk 63 comprises a projection 64. After a rotation of about 300° the projection can push a longitudinally movable pin 65 upwards for ejection of the container 6. Furthermore, the ejector can be constructed in such a way that it expels the container 6 in response to winding of the spring motor.

Figure 13:
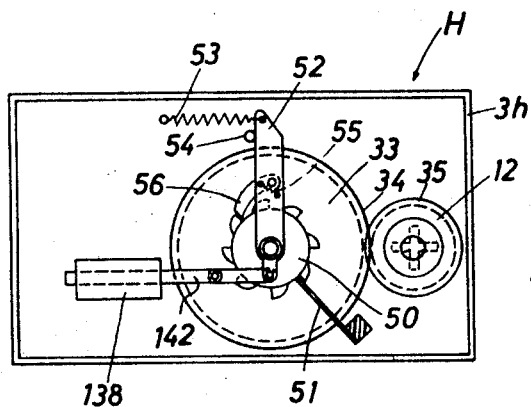
FIG. 13 is a top plan view of a flash unit with an electromagnetically operated drive for the socket and with a different indexing mechanism.

Referring to FIG. 13, there is shown a flash unit H which resembles the unit E of FIG. 7 but need not comprise a spring motor. The drive for the socket 12 comprises an electromagnet 138 and the transmission 34, 35. The disk 33 is not biased by a spring (such as the spring 25e of FIG. 7) but this disk carries a ratchet wheel 50 which forms part of a one-way clutch. A leaf spring 51 which is secured to the housing 3h normally impedes rotation of the ratchet wheel 50 in a clockwise direction, as viewed in FIG. 13. The armature 142 of the electromagnet 138 is articulately connected with a lever 52 which is rockable about the axis of the ratchet wheel 50 and is permanently biased by a spring 53 corresponding to the spring 38b of FIG. 7 and tending to maintain the armature in extended position as shown in FIG. 13. The longer arm of the lever 52 then abuts against a fixed stop pin 54 of the housing 3h. A pawl 56 on the longer arm of the lever 52 is biased by a contraction spring 55 so that its pallet bears against the toothed periphery of the ratchet wheel 50.

When a flash lamp 7 is ignited, the circuit of the electromagnet 138 is completed, for example, in a manner as described for the electromagnet 38 of FIG. 7, whereby the electromagnet 138 attracts its armature 142 and the pawl 56 rides over the flank of one tooth on the ratchet wheel 50. When the circuit of the electromagnet 138 is deenergized, the spring 53 contracts and causes the pallet of the pawl 56 to turn the ratchet wheel 50 through an angle of 45 degrees whereby the socket 12 turns through 90 degrees. Thus, the indexing mechanism of FIG. 13 has a built-in delay unit which insures that the socket 12 turns subsequent to completion of an exposure with flash.

It is further clear that the improved flash unit may be modified in a number of additional ways without departing from the spirit of our invention. For example, certain component parts of various flash units shown in FIGS. 1 to 13 may be combined with or substituted for each other. Thus, the indexing mechanism of FIG. 6 could be modified by replacing the plunger 31 with an electromagnet which would allow the spring 25 to turn the socket 12 through an angle of 90 degrees in response to completion of the flash circuit. It is also clear that the battery 15 is removable and that this battery may comprise two or more cells. The removability of the battery 15 has been described in connection with FIGS. 1 to 3 which show that the housing 3 of the flash unit A comprises two separable parts.

Finally, the hinge 58 shown in FIGS. 1 and 2 may be replaced by another device which provides an articulate connection between the housing of the flash unit and the female coupling member 2 of the camera 1. For example, the connection between the foot 4 and the housing 3 shown in FIGS. 1 to 3 could comprise a ball joint or another suitable universal joint which would allow the flash unit A to assume any desired position of inclination with reference to the camera. Such ball joints are well known from the art of tripods for photographic cameras.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is:

1. A flash unit for use on photographic cameras, comprising housing means for at least one electrical component of the flash circuit; coupling means supporting said housing means and adapted to engage complementary coupling means on a camera to thus provide a separable connection between such camera and said housing means; an articulate connection between said housing means and said first named coupling means; and socket means rotatably supported by said housing means and adapted to receive a portion of a multiple flash lamp container so that such container can rotate with said socket means.

2. A structure as set forth in claim 1, wherein said articulate connection comprises a hinge.

3. A structure as set forth in claim 1, wherein said articulate connection comprises a universal joint.

4. A flash unit as set forth in claim 1, further comprising drive means for rotating said socket means with reference to said housing means.

5. A structure as set forth in claim 4, wherein said drive means comprises a spring motor.

6. A structure as set forth in claim 5, wherein said spring motor comprises a spring arranged to store energy in response to rotation of said socket means in one direction and, upon completed winding, tends to dissipate such energy and to thereby rotate said socket means in the opposite direction.

7. A structure as set forth in claim 6, wherein the socket means is rotatable in said one direction by a flash lamp container when the latter is properly connected with said socket means.

8. A structure as set forth in claim 4, further comprising indexing means cooperating with said drive means for arresting said socket means in positions wherein successive flash lamps of a container which is coupled with said socket means face in a predetermined direction.

9. A structure as set forth in claim 8, wherein said drive means comprises a spring motor.

10. A structure as set forth in claim 9, further comprising a retard mechanism for controlling the speed of said spring motor during indexing of said socket means.

11. A structure as set forth in claim 8, wherein said indexing means comprises electromagnet means arranged to effect movement of said socket means in response to completion of an exposure with flash.

12. A structure as set forth in claim 11, wherein said electromagnet means is connected in said flash circuit.

13. A structure as set forth in claim 12, wherein said flash circuit further comprises a source of electrical energy, a capacitor, and one lamp of the container when the latter is properly connected with said socket means, said one lamp and said capacitor being connected in series with said electromagnet means.

14. A structure as set forth in claim 12, wherein said indexing means comprises means for releasably holding said socket means in angular positions in which successive lamps of said container are in optimum positions for making exposures with flash.

15. A structure as set forth in claim 14, wherein said indexing means comprises an indexing member of polygonal outline connected to and rotatable with said socket means and resilient follower means bearing against said indexing member.

16. A structure as set forth in claim 15, wherein said indexing member has a plurality of sides, one for each lamp of a container.

17. A structure as set forth in claim 14, wherein said indexing means comprises an indexing member connected to an rotatable with said socket means, said indexing member having a peripheral surface provided with a plurality of recesses, one for each lamp of a container, and spring biased follower means supported by said housing means and tracking said peripheral surface, one lamp of said container being held in optimum position for making an exposure with flash when said follower means enters one of said recesses.

18. A structure as set forth in claim 17, wherein each of said recesses is bounded by a concave portion of said peripheral surface and wherein said indexing member resembles a star wheel.

19. A structure as set forth in claim 12, further comprising counter means for indicating the number of unexpended lamps in a container which is connected with said socket means.

20. A structure as set forth in claim 19, further comprising indexing means cooperating with said drive means for releasably holding said socket means in angular positions in each of which one lamp of a properly connected container faces the subject, said counter means comprising index means fixed to said housing means and scale means movable along said index means in response to operation of said indexing means.

21. A flash unit for use on photographic cameras, comprising housing means; a flash circuit having at least one electrical component installed in said housing means; coupling means supporting said housing means and adapted to engage complementary coupling means on a camera to thus provide a separable connection between such camera and said housing means; socket means rotatably supported by said housing means and adapted to receive a portion of a multiple flash lamp container so that such container can rotate with said socket means; drive means for rotating said socket means with reference to said housing means; and indexing means cooperating with said drive means for arresting said socket means in positions wherein successive flash lamps of a container which is coupled to said socket means face in a predetermined direction, said indexing means comprising electromagnet means connected in said flash circuit and arranged to effect movement of said socket means in response to completion of an exposure with flash, said flash circuit further comprising a normally open synchronizing switch, one lamp of said container when the latter is properly connected with said socket means, a source of electrical energy, and transistor means having a base connected with the positive pole of said source in response to closing of said synchronizing switch, said transistor means comprising an emitter-collector stage connected in parallel with said one lamp and being arranged to energize said electromagnet means in response to closing of said synchronizing switch, said switch and said one lamp being connected in series.

22. A flash unit for use on photographic cameras, comprising housing means; a flash circuit having at least one electrical component installed in said housing means; coupling means supporting said housing means and adapted to engage complementary coupling means on a camera to thus provide a separable connection between such camera and said housing means; socket means rotatably supported by said housing means and adapted to receive a portion of a multiple flash lamp container so that such container can rotate with said socket means; drive means for rotating said socket means with reference to said housing means; and indexing means cooperating with said drive means for arresting said socket means in positions wherein successive flash lamps of a container which is coupled to said socket means face in a predetermined direction, said indexing means comprising electromagnet means connected in said flash circuit and arranged to effect movement of said socket means in response to completion of an exposure with flash, said flash circuit further comprising a source of electrical energy, a normally open synchronizing switch connected in parallel with said electromagnet means, one lamp of said container when the latter is properly connected with said socket means, said one lamp being connected in parallel with said synchronizing switch and with said electromagnet means, and a second switch connected in series with said source and with said electromagnet means and arranged to close in response to connection of a container to said socket means.

References Cited

UNITED STATES PATENTS

| | | | |
|---|---|---|---|
| 3,080,804 | 3/1963 | Steineck | 95—11.5 |
| 3,096,025 | 7/1963 | Prochnow | 240—1.3 |
| 3,263,068 | 7/1966 | Jakob | 240—1.3 |
| 3,286,611 | 11/1966 | Lange | 95—11 |
| 3,335,651 | 8/1967 | Williams et al. | 95—11 |
| 3,353,465 | 11/1967 | Peterson et al. | 95—11.5 |
| 3,353,467 | 11/1967 | Ernisse et al. | 95—11.5 |
| 3,353,468 | 11/1967 | Beach | 95—11.5 |
| 3,354,300 | 11/1967 | Parsons et al. | 240—1.3 |
| 3,312,086 | 4/1967 | Casebeer et al. | 240—1.3 XR |
| 3,380,357 | 4/1968 | Harvey | 95—11.5 |

FOREIGN PATENTS 848,012  9/1952  Germany.

NORTON ANSHER, Primary Examiner

FRED L. BRAUN, Assistant Examiner

U.S. Cl. X.R.

240—1.3